Oct. 19, 1965     J. H. BOURNE     3,213,335
PERMANENT MAGNET
Filed March 2, 1962
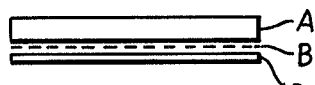
FIG.1
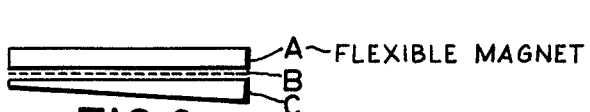
FIG.2 — FLEXIBLE MAGNET
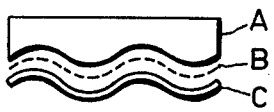
FIG.3a
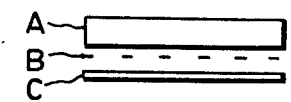
FIG.3b
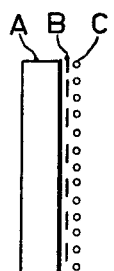
FIG.4a
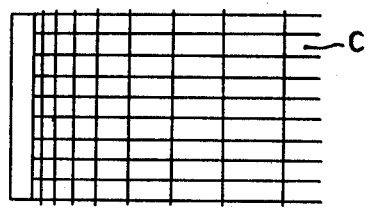
FIG.4b
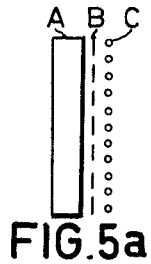
FIG.5a
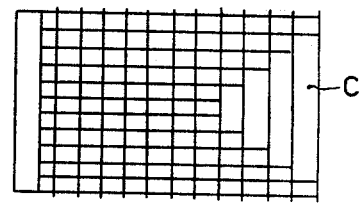
FIG.5b
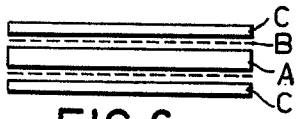
FIG.6
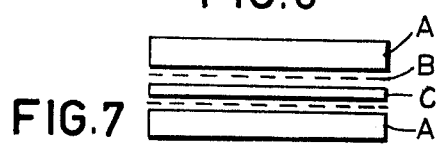
FIG.7
INVENTOR
JOHN H. BOURNE
BY
AGENT 3,213,335
PERMANENT MAGNET
John Hamilton Bourne, East Glenelg, South Australia, Australia, assignor to North American Philips Company, Inc., New York, N.Y., a corporation of Delaware
Filed Mar. 2, 1962, Ser. No. 177,114
5 Claims. (Cl. 317—201)

Permanent magnets of flexible materials are known. These permanent magnets are composed of a mixture of a flexible plastic material and a powdered material having permanent magnetic properties such as barium ferrite.

While these flexible magnets are very useful for many applications, they have the disadvantage that while, because of their very nature, they can be bent easily into a desired shape they do not maintain that shape and it is therefore necessary that some means should be provided for holding them in that shape.

An object of the present invention is to provide a flexible magnet in the form of a laminate which has the property of being easily bent into a desired shape and of retaining that shape when bent.

The invention consists in a permanent magnet in the form of a laminate comprising a layer or layers of flexible magnetic or magnetizable material secured to a metal or plastic reinforcing layer or layers which laminate is capable of being readily deformed to a desired shape and of retaining that shape.

The invention further consists in a method of making a permanent magnet comprising the steps of securing a layer of a flexible magnetic or magnetizable material to a reinforcing layer to form a laminate which is capable of being readily deformed to a desired shape and of retaining that shape, bending the laminate so formed to a desired shape and if necessary magnetizing the article so formed.

The term "permanent magnet" is to be understood to include an article which although not magnetic may be permanently magnetized.

The layers of the laminate may be bonded together by an adhesive or by any other known convenient means such as by riveting.

The reinforcing layer in a permanent magnet according to the invention, if of metal, may or may not have ferromagnetic properties of itself according to the requirements of the intended purpose of the permanent magnet.

The type of adhesive used to bond the magnetic layer to the reinforcing layer will depend upon the nature of the plastic used in the manufacture of the magnetic layer and the material of the reinforcing layer.

In order that the invention may be better understood and put into practice several embodiments thereof are hereinafter described, by way of example, with reference to the accompanying drawings, in which:

FIG. 1 is a diagrammatic view illustrating one form of the invention,

FIG. 2 is a similar view illustrating a second form of the invention,

FIGS. 3a and 3b illustrate a third form in side view and elevation respectively, FIGS. 4a and 4b are similar views of a fourth form, FIGS. 5a and 5b are similar views of a fifth form, and FIGS. 6 and 7 each illustrate a further form of the invention.

FIG. 1 illustrates the simplest form of the invention and in this figure, as in all the other figures, A indicates a layer of flexible magnetic or magnetizable material in the form of a strip or sheet, B indicates a layer of bonding material and C indicates a reinforcing layer of metal or plastic material. The thickness and characteristics of the reinforcing layer are chosen so that the laminate constituting the permanent magnet is capable of being deformed readily to a desired shape and of retaining that shape. If the reinforcing layer is of metal it may be of ferromagnetic material if desired. The bonding layer B is chosen to suit the materials forming the other two layers of the laminate and it should be appreciated that in some constructions this layer may not be present in a separate form, for example the two outer layers of the laminate may be united by vulcanizing or by riveting. In this form of the invention it should be noted that it has approximately the same stiffness in all directions and may therefore be bent as easily in one direction as in another.

FIG. 2 illustrates an arrangement similar to that of FIG. 1 with the exception of the fact that the reinforcing layer C is of varying thickness so as to give a varying degree of stiffness. While in this figure the thickness of the reinforcing layer varies uniformly from one end to the other it will be appreciated that the thickness may be varied in any desired manner to provide extra stiffness in one or more directions. Variable stiffness may also be obtained by using a slotted reinforcing layer. This may be used as a means of giving preferred bending along a line of weakness and also as a means for reducing weight.

The arrangement shown in FIGS. 3a and 3b is essentially similar to that of FIG. 1 with the exception that stiffness in one direction and flexibility in another are obtained by using a corrugated reinforcing layer. It will be readily appreciated that the laminate will be more flexible when bent about a line parallel to the corrugations than when bent about a line at right angles to them.

FIGS. 4a, 4b, 5a and 5b show two arrangements in which the reinforcing layer consists of a mesh of wires arranged to give variable stiffness. In FIGS. 4a and 4b the pitch or distance between adjacent wires is varied in the case of wires running in one direction, whereas in FIGS. 5a and 5b the wires running in one direction are of different lengths so as to leave a portion of the laminate having wires running in one direction only.

FIGS. 6 and 7 illustrate arrangements in which the laminate consists of a double layer. In FIG. 6 for example a layer of flexible magnetic or magnetizable material is sandwiched between two reinforcing layers whereas in FIG. 7 a single layer of reinforcing material is sandwiched between two layers of flexible magnetic or magnetizable material. The use of a double layer would tend to reduce any tendency to deformation with change of temperature.

While I have described the invention in accordance with specific embodiments and applications thereof, it will be obvious to those skilled in the art that other modifications can be made therein without departing from the spirit and scope of the invention as defined in the appended claims.

What is claimed is:

1. A composite permanent magnet comprising a flexible resilient permanent magnet body composed of a mixture of particles of permanent magnet material and a binder of plastic material, and a pliable ferromagnetic metal reinforcing member secured to said body to retain the same in a desired shape while permitting the same to be easily bent into said shape.

2. A permanent magnet as claimed in claim 1 in which the reinforcing member is of varying thickness.

3. A permanent magnet as claimed in claim 1 in which the reinforcing member secured to the body is corrugated.

4. A permanent magnet as claimed in claim 1 in which the reinforcing member secured to the body is a wire mesh.

5. A composite permanent magnet comprising a plurality of flexible resilient permanent magnet bodies each comprised of a mixture of particles of permanent magnet material and a binder of plastic material, and means to retain said bodies in a desirable shape while permitting the same to be easily bent into said shape, said means comprising a reinforcing member disposed between adjacent magnet bodies and secured thereto.

References Cited by the Examiner

UNITED STATES PATENTS

| | | | |
|---|---|---|---|
| 2,887,454 | 5/59 | Toulmin | 317—201 |
| 2,958,019 | 10/60 | Scholten et al. | 317—201 |
| 2,959,832 | 11/60 | Baermann | 317—201 |
| 3,115,434 | 12/63 | Hahn | 24—201 |
| 3,124,725 | 3/64 | Leguillon | 317—201 |

JOHN F. BURNS, *Primary Examiner.*

E. JAMES SAX, *Examiner.*